ns Gerardus Antonius Luijten, Utrecht, Netherlands, assignor to North American Philips Company, Inc., New York, N.Y., a corporation of Delaware
No Drawing. Filed Mar. 1, 1960, Ser. No. 11,978
Claims priority, application Netherlands, Mar. 5, 1959, 236,826
5 Claims. (Cl. 167—30)

It is known that organic compounds of tetravalent tin of the structure:

wherein $R_1$, $R_2$ and $R_3$ designate arbitrary organic groups, which are bound to the tin atom by carbon and X is a monovalent organic or inorganic group, not bound to the tin atom by carbon, may be suitable for combating fungi and bacteria. By way of example, triphenyltinhydroxide is mentioned.

It is furthermore generally known that many compounds having a satisfactory fungicidal effect are not suitable for combating in practice the fungi on living plants, since they excessively damage the plants by their phytotoxic activity.

Of the aforesaid group of organic tin compounds it is stated, for example, that many of them exhibit, apart from a satisfactory fungicidal activity, a strong phytotoxicity. For this reason only a few of the compounds of these groups are said to be useful for combating fungi on living plants. However, even these have an appreciable phytotoxicity with certain plants. With triaryl-tin compounds, in which the fourth valence of tin is occupied by chlorine, a hydroxyl- or an acetyl-group, the phytotoxicity is said to be reduced by using, as a carrier, finely powdered calciumcarbonate, in compositions containing these tin compounds as an active substance.

It has now been found that bis(triphenyltin)oxide has, apart from a satisfactory fungicidal action, such a low phytotoxicity that it is very suitable as an active substance in compositions for combating, in practice, fungi on living plants. This is not restricted to compositions having finely divided calcium carbonate as a carrier.

The invention relates, more particularly, to the production of a fungicidal composition containing, as an active substance, an organic phenyl-group-containing tin compound by mixing this substance with or dissolving it in a solid or liquid carrier, if desired with the addition of auxiliary substances, such as surface-active agents, dispersing agents and adhesives, and is characterized in that bis(triphenyltin)oxide is used as an active substance.

Bis(triphenyltin)oxide is a substance known per se. It is stated that it is obtained by repeated crystallization of triphenyltinhydroxide from anhydrous acetonitrile. However, this method cannot be used for the production of bis(triphenyltin)oxide.

The applicant has now found that bis(triphenyltin)oxide can be produced in a very suitable manner by causing triphenyltinhydroxide to react with carbon dioxide and by converting the resultant product, a mixture of triphenyltinhydrocarbonate and bis(triphenyltin)carbonate into bis(triphenyltin)oxide, while the carbon dioxide set free is removed.

These carbonates dissociate even at normal temperature, while giving off carbon dioxide; they change in this case into bis(triphenyltin)oxide. This decomposition is furthered by heating and by removing the carbon dioxide set free. The conversion of the triphenyltincarbonates is preferably carried out by heating them at a temperature lying between 40° C. and 90° C., particularly at about 60° C. Heating is continued until substantially no more carbon dioxide escapes. Then the carbonates have been converted substantially completely into bis(triphenyltin)oxide. Although the method according to the invention is not restricted thereto, the conversion of the triphenyltincarbonates is preferably carried out in a substantially dry state.

The conversion of triphenyltinhydroxide with carbon dioxide is preferably performed in the presence of a solvent for the hydroxide. As solvents there may be used particularly chlorinated hydrocarbons, such as chloroform, dichloroethane and trichloroethylene.

Example

Into a solution of 100 gs. of triphenyltinhydroxide in 1 litre of chloroform carbon dioxide was introduced at about 20° C., for about 30 minutes. The resultant deposit was filtered off, washed with chloroform, dried and then kept at about 60° C. for a few hours. The carbonate had changed substantially completely into bis(triphenyltin)oxide. Yield: 90 gs. (92%). Melting point 123 to 124° C.

The satisfactory fungicidal action and the low phytotoxicity of compositions containing bis(triphenyltin)oxide as an active substance has been ascertained by applicant in outdoor tests on fields, these compositions being compared with those in which triphenyltinacetate is used as an active constituent. The triphenyltinacetate has hitherto been considered as the least phytotoxic, organo-tin compound having a satisfactory fungicidal effect.

The tests were made on two potato species on different kinds of ground and on four apple species.

With the tests on potatoes the compositions with bis(triphenyltin)oxide, on the basis of the affection by Phytophthora infestans, exhibited a better fungicidal effect, apart from a considerably lower phytotoxicity, as compared with the compositions with triphenyltinacetate as an active substance. The better action of the compositions with bis(triphenyltin)oxide was also proved in a higher yield of tubers and a more favourable ratio between sound tubers and affected tubers.

With the tests on species of apples, the trees were, in all cases, free from attack by apple scab (Venturia inaequalis), with the tests carried out with the compositions containing triphenyltinacetate the leaves exhibited a certain degree of burning, with those having bis(triphenyltin)oxide they did not.

Applicant has found that the fungicidal effect and the phytotoxicity of the bis(triphenyltin)oxide containing composition is substantially not affected by a contamination with the aforesaid carbonates.

The bis(triphenyltin)oxide may be processed to obtain fungicidal compositions in the form of dusts, wettable powders, miscible oils and seed disinfectants in a manner known for the production of similar compositions. Possible forms of processing are, for example, (1) Dusts having, for example, 5% of active substance in a mixture of kieselguhr and dolomite marl;

(2) Wettable powders having 20 to 80% of active substance and, in addition, wetting agents such as fatty alcohol sulphates or alkylarylsulphonates, as well as dispersion agents and/or an inert carrier, for example, kaolin, chalk, infusorial earth, conditioned or not conditioned with colloidal silicic acid;

(3) Miscible oils with 5 to 20% of active constituent, 5 to 10% of non-ionic emulsifier or a mixture thereof with an anion-active emulsifier and furthermore solvents (especially ketones, such as cyclohexanone).

(4) Seed disinfectants with, for example, 20 to 60% of the active substance in conjunction with kaolin under the addition of adhesives, for example, spindle oil.

What is claimed is:

1. A method of combatting plant harmful fungi comprising treating living plants with a fungicidal composition consisting of a fungicidally effective amount of bis (triphenyltin) oxide and an inert carrier therefor.

2. A fungicidal wettable powder consisting of from 20 to 80% by weight of bis(triphenyltin)oxide, a wettable agent in a lesser amount and an inert powder.

3. A fungicidal miscible oil consisting of from 5 to 20% by weight of bis(triphenyltin)oxide, an emulsifying agent in a lesser amount and an oil solvent for said tin oxide.

4. A seed disinfectant consisting of from 20 to 60% by weight of bis(triphenyltin)oxide, a liquid adhesive and a solid inert carrier therefor.

5. The method of combatting fungi on living plants comprising treating said plants with a fungicidally effective amount of bis (triphenyltin) oxide.

References Cited by the Examiner

UNITED STATES PATENTS

| | | | |
|---|---|---|---|
| 2,770,611 | 11/1956 | Nietsche | 260—429.7 |
| 2,867,563 | 1/1959 | Musser | 167—30 |
| 2,880,129 | 3/1959 | Billings | 167—30 |
| 2,912,448 | 11/1959 | Ramsden | 260—429.7 |
| 2,915,428 | 12/1959 | Weinberg | 167—13 |
| 3,037,037 | 5/1962 | Nyholm | 260—429.7 |
| 3,140,977 | 7/1964 | Duyfjes et al. | 167—30 |

OTHER REFERENCES

Chem. Abst., vol. 37 (1943), pp. 2721–2722.

Coates, "Organo Metallic Compounds," John Wiley and Sons, Inc., New York, 1956, page 189.

Luijten et al.: Investigations in the Field of Organic Chemistry, The Research Institute (1955), pp. 105, 107, 110, 112.

JULIAN S. LEVITT, *Primary Examiner.*

MORRIS O. WOLK, LEWIS GOTTS, *Examiners.*